(12) United States Patent
Fukuzawa

(10) Patent No.: US 12,103,337 B2
(45) Date of Patent: Oct. 1, 2024

(54) TIRE WITH CARCASS PLY HAVING CONDUCTIVE THREAD SEWN PORTION

(71) Applicant: BRIDGESTONE CORPORATION, Tokyo (JP)

(72) Inventor: Kazuyuki Fukuzawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 255 days.

(21) Appl. No.: 17/614,078

(22) PCT Filed: Jun. 19, 2020

(86) PCT No.: PCT/JP2020/024156
§ 371 (c)(1),
(2) Date: Nov. 24, 2021

(87) PCT Pub. No.: WO2020/256111
PCT Pub. Date: Dec. 24, 2020

(65) Prior Publication Data
US 2022/0258547 A1 Aug. 18, 2022

(30) Foreign Application Priority Data

Jun. 19, 2019 (JP) ................................. 2019-113305

(51) Int. Cl.
*B60C 19/08* (2006.01)
*B60C 9/11* (2006.01)
*B60C 9/13* (2006.01)

(52) U.S. Cl.
CPC .............. *B60C 19/084* (2013.01); *B60C 9/11* (2013.01); *B60C 9/13* (2013.01); *B60C 19/08* (2013.01); *B60C 19/082* (2013.01); *B60C 19/088* (2013.01)

(58) Field of Classification Search
CPC ..... B60C 19/08; B60C 19/084; B60C 19/088; B60C 19/082; B60C 19/086
See application file for complete search history.

(56) References Cited

U.S. PATENT DOCUMENTS

| | | |
|---|---|---|
| 2010/0078103 A1 | 4/2010 | Nakamura |
| 2015/0328941 A1 | 11/2015 | Hirosue |
| 2017/0197480 A1 | 7/2017 | Hoshino |
| 2018/0154705 A1 | 6/2018 | Moser et al. |
| 2019/0023083 A1 | 1/2019 | Yanagioka et al. |

(Continued)

FOREIGN PATENT DOCUMENTS

| | | |
|---|---|---|
| CN | 1253084 A | 5/2000 |
| CN | 101535065 A | 9/2009 |
| CN | 103241069 A | 8/2013 |

(Continued)

OTHER PUBLICATIONS

International Search Report of PCT/JP2020/024156 dated Sep. 1, 2020 [PCT/ISA/210].

(Continued)

*Primary Examiner* — Adrienne C. Johnstone
(74) *Attorney, Agent, or Firm* — Sughrue Mion, PLLC

(57) ABSTRACT

One aspect of the tire of the present invention is a tire including a tread portion (11), a sidewall portion (12), a bead portion (13), a bead core (60) provided in the bead portion (13), and a carcass ply (51) covering at least a portion around the bead core (60), in which the carcass ply (51) includes a sewn portion (80) in which a conductive thread (81, 82) is sewn.

5 Claims, 4 Drawing Sheets

(56) References Cited

U.S. PATENT DOCUMENTS

2019/0160891 A1    5/2019  Park et al.

FOREIGN PATENT DOCUMENTS

| | | |
|---|---|---|
| CN | 103317976 A | 9/2013 |
| CN | 108473008 A | 8/2018 |
| CN | 109835126 A | 6/2019 |
| EP | 0 995 618 A2 | 4/2000 |
| JP | 03-169711 A | 7/1991 |
| JP | 2008-13879 A | 1/2008 |
| JP | 2015-020499 A | 2/2015 |
| JP | 2015-120446 A | 7/2015 |
| JP | 2017-124730 A | 7/2017 |
| JP | 2019-051849 A | 4/2019 |
| JP | 2019-081401 A | 5/2019 |
| WO | 2014/109169 A1 | 7/2014 |
| WO | 2017/122509 A1 | 7/2017 |

OTHER PUBLICATIONS

Search Report of Chinese Office Action dated Dec. 14, 2022 in Chinese Application No. 202080039217.7.
Li Chengmin et al., "Tire Industry", Research on the Electrical Conductivity of Tires, 2013, No. 3, pp. 135-139 (5 pages total).
Search Report dated Apr. 20, 2023 from the Chinese Patent Office in Application No. 202080039217.7.
Jiang Zhang, "Continental presents new concept tyre technology", Light Vehicles, 2018, vol. 3, pp. 61-65 and 30 (6 total pages).

TIRE WITH CARCASS PLY HAVING CONDUCTIVE THREAD SEWN PORTION

CROSS REFERENCE TO RELATED APPLICATIONS

This application is a National Stage of International Application No. PCT/JP2020/024156, filed Jun. 19, 2020, claiming priority to Japanese Patent Application No. 2019-113305, filed Jun. 19, 2019, the contents of which are incorporated herein by reference in their entirety.

TECHNICAL FIELD

The present invention relates to a tire.

BACKGROUND ART

For example, as described in Patent Document 1, a tire having a carcass ply is known.

CITATION LIST

Patent Document

[Patent Document 1]
Japanese Unexamined Patent Application, First Publication No. 2015-20499

SUMMARY OF INVENTION

Technical Problem

In the above tires, reduction of rolling resistance is required. In order to reduce the rolling resistance, for example, an amount of carbon contained in a carcass rubber in a carcass ply may be reduced. However, when the amount of carbon contained in the carcass rubber is reduced, volume resistivity of the carcass rubber increases, and a conductive path from a bead portion to a tread surface portion may be blocked by the carcass ply. Therefore, it may be difficult for static electricity transmitted from a vehicle to the bead portion to be released from the tread surface portion to the ground.

In view of the above circumstances, one aspect of the present invention is to provide a tire having a structure in which static electricity from a vehicle can be easily released to the ground regardless of conductivity of the carcass ply.

Solution to Problem

According to an aspect of the present invention, there is provided a tire including: a tread portion; a sidewall portion; a bead portion; a bead core provided in the bead portion; and a carcass ply covering at least a portion around the bead core, in which the carcass ply includes a sewn portion in which a conductive thread is sewn.

Advantageous Effects of Invention

According to one aspect of the present invention, there is provided a tire having a structure in which static electricity from a vehicle is easily released to the ground regardless of conductivity of a carcass ply.

DESCRIPTION OF EMBODIMENTS

Hereinafter, a tire according to an embodiment of the present invention will be described with reference to the drawings. A scope of the present invention is not limited to the following embodiment, and can be arbitrarily changed within a scope of a technical idea of the present invention. Further, in the following drawings, a scale and a number of each structure may be different from a scale and a number of an actual structure in order to make each configuration easy to understand.

Figure 1:
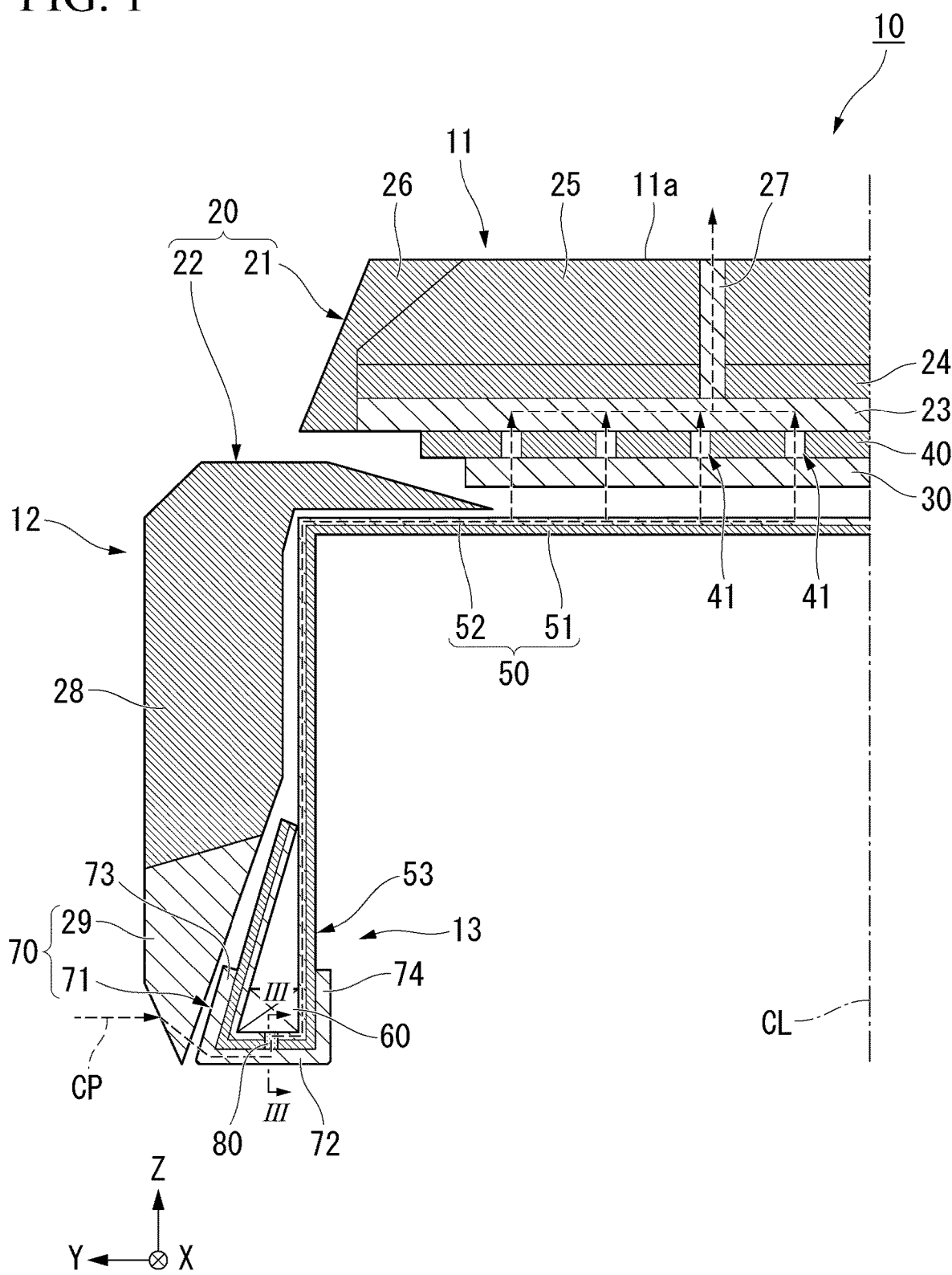
FIG. 1 is a cross-sectional view schematically showing a portion of a tire of the present embodiment, and is a cross-sectional view taken along a tire width direction.

A Z-axis direction shown in each drawing is a direction parallel to a tire radial direction. For example, the tire radial direction in FIG. 1 is an up-down direction. In a portion of the tire shown in each drawing, a positive side in the Z-axis direction, that is, for example, an upper side in FIG. 1 is an outside in the tire radial direction, and a negative side in the Z-axis direction, that is, for example, a lower side in FIG. 1 is an inside in the tire radial direction.

A Y-axis direction shown in each drawing is a direction parallel to a tire width direction. In FIG. 1, the tire width direction is a left-right direction. In the following descriptions, for a certain object, a side closer to a tire equatorial portion CL in the tire width direction is referred to as an "inside in the tire width direction", and a side far from the tire equatorial portion CL in the tire width direction is referred to as an "outside in the tire width direction". The tire equatorial portion CL is a center in the tire width direction of the tire. In a portion of the tire shown in each drawing, a negative side in the Y-axis direction, that is, for example, a right side of FIG. 1 is an inside in the tire width direction, and a positive side in the Y-axis direction, that is, for example, a left side of FIG. 1 is an outside in the tire width direction.

Further, a circumferential direction of the tire around a central axis (not shown) is referred to as a tire circumferential direction. The X-axis direction shown in each drawing is a direction orthogonal to both the Z-axis direction and the Y-axis direction, and indicates the circumferential direction in the cross section of the tire shown in each drawing.

FIG. 1 shows only a portion of the cross section of a tire 10 of the present embodiment in the tire circumferential direction, which is located on one side in the tire width direction from the tire equatorial portion CL. In the cross section of a portion of the tire 10 in the tire circumferential direction, a portion located on the other side of the tire equatorial portion CL in the tire width direction is disposed symmetrically with the portion shown in FIG. 1 in the tire width direction in a state where the tire equatorial portion CL is interposed therebetween. In the following description, the portion of the tire 10 shown in FIG. 1 will be described, and the portion of the tire 10 located on the other side in the tire width direction from the tire equatorial portion CL may be omitted.

As shown in FIG. 1, the tire 10 of the present embodiment includes a tread portion 11, a sidewall portion 12, and a bead portion 13.

The tread portion 11 is disposed outside the bead portion 13 in the tire radial direction, and is located at an outer end portion of the tire 10 in the tire radial direction. The tread portion 11 has an annular shape extending in the tire circumferential direction. The tread portion 11 has a tread surface portion 11a which is a ground contact surface of the tire 10. The tread surface portion 11a is a portion of an outer surface of the tread portion 11 in the tire radial direction.

For example, the tread surface portion 11a is the ground contact surface of the tread portion 11 in a state where the tire 10 is mounted on a standard rim specified in "JATMA Year Book", and the tire 10 is filled with the internal pressure (hereinafter, referred to as a specified internal pressure) of 100% of an air pressure (maximum air pressure) corresponding to a maximum load capacity (internal pressure—bold load of load capacity correspondence table) in an applicable size and ply rating in "JATMA Year Book" such that a maximum load corresponding to the maximum load capacity is applied.

For example, when a region where the tire 10 is produced or used is other than Japan, the tread surface portion 11a is the ground contact surface of the tread portion 11 in a state where the tire 10 is based on an industrial standard (for example, "TRA Year Book" in the United States, "ETRTO Standard Manual" in Europe, or the like) applied to the region other than Japan.

The sidewall portion 12 extends inward in the tire radial direction from an outer end portion of the tread portion 11 in the tire width direction. The sidewall portion 12 connects the outer end portion of the tread portion 11 in the tire width direction and the bead portion 13.

The bead portion 13 is connected to an inner end portion of the sidewall portion 12 in the tire radial direction. A bead core 60 is provided in the bead portion 13. More specifically, the bead core 60 is embedded in the bead portion 13.

Figure 2:
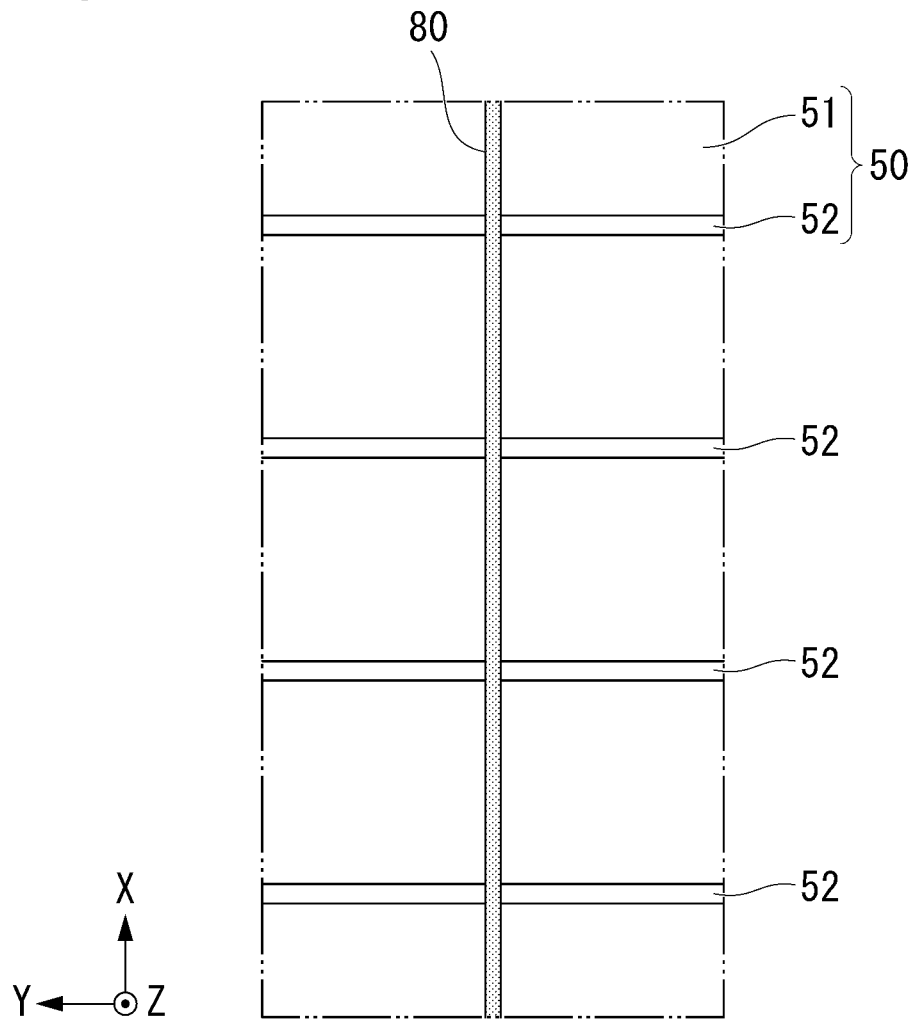
FIG. 2 is a plan view when a portion of a carcass layer of the present embodiment is viewed from the outside in a tire radial direction.

The tire 10 includes a carcass layer 50 which serves as a skeleton. For example, the tire 10 is configured by assembling a first chafer portion 71, a tire body 20, a belt layer 30, and a belt reinforcing layer 40 to the carcass layer 50. The carcass layer 50 is provided so as to straddle the tread portion 11, the sidewall portion 12, and the bead portion 13. The carcass layer 50 has an annular shape extending along the tire circumferential direction. As shown in FIGS. 1 and 2, the carcass layer 50 has a carcass ply 51 and a conductive portion 52.

Figure 3:
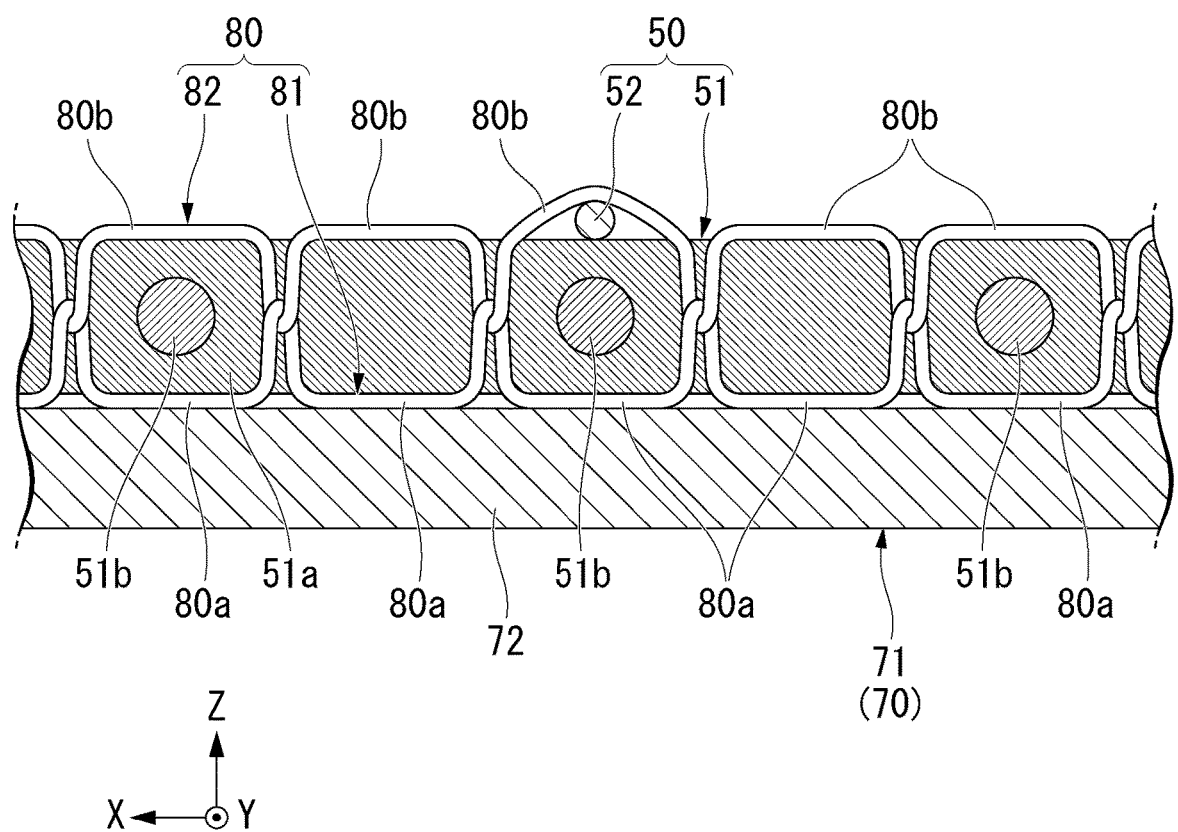
FIG. 3 is a cross-sectional view illustrating a portion of the tire of the present embodiment, and is a cross-sectional view taken along line in FIG. 1.

The carcass ply 51 covers at least a portion around the bead core 60. The carcass ply 51 in the present embodiment extends from the tread portion 11 to the bead portion 13 via the sidewall portion 12 and is folded outward around the bead core 60 in the tire width direction. The carcass ply 51 has an annular shape extending along the tire circumferential direction. As shown in FIG. 3, the carcass ply 51 has a carcass rubber 51a and a plurality of ply cords 51b. The carcass ply 51 is configured by embedding the plurality of ply cords 51b in the carcass rubber 51a.

In the present embodiment, a loss tangent tan 6 of the carcass rubber 51a is relatively small. The loss tangent tan 6 becomes smaller as a carbon content in the carcass rubber 51a is smaller. The smaller the loss tangent tan 6 of the carcass rubber 51a, the smaller the rolling resistance of the tire 10. In the present embodiment, the carcass rubber 51a is relatively difficult to conduct electricity. As a result, the conductivity of the carcass ply 51 in the present embodiment is relatively low.

The plurality of ply cords 51b extend from the tread portion 11 to the bead portion 13 via the sidewall portion 12 and are folded outward in the tire width direction around the bead core 60 in a state of being embedded in the carcass rubber 51a. The plurality of ply cords 51b are disposed at intervals along the tire circumferential direction. For example, the ply cord 51b is an organic fiber cord or the like.

The conductive portion 52 is provided on the outer surface of the carcass ply 51. As shown in FIG. 1, the conductive portion 52 extends along the carcass ply 51. The conductive portion 52 is located outside the carcass ply 51 in the tire radial direction in the tread portion 11. In the present embodiment, the conductive portion 52 extends from the tread portion 11 to at least the inside of the bead core 60 in the tire radial direction. In the present embodiment, the conductive portion 52 extends from the tread portion 11 to the bead portion 13 via the sidewall portion 12, is folded around the bead core 60 to the outside in the tire width direction, and extends to the outside of the bead core 60 in the tire width direction.

An outer end portion of the conductive portion 52 folded around the bead core 60 in the tire radial direction is disposed at the same position in the tire radial direction as an outer end portion of the carcass ply 51 folded around the bead core 60 in the tire radial direction. In the bead portion 13, the conductive portion 52 is provided inside the carcass ply 51 folded around the bead core 60. As shown in FIG. 3, the plurality of conductive portions 52 are attached to the outer surface of the carcass rubber 51a in the tire radial direction inside the bead core 60 in the tire radial direction.

In the present embodiment, the conductive portion 52 is a thread-like member containing metal. For example, the conductive portion 52 is a conductive thread in which a metal fiber such as stainless steel is wound around an organic fiber. The plurality of conductive portions 52 are provided at intervals along the tire circumferential direction.

FIG. 3 shows, as an example, a state in which the conductive portion 52 is located outside the ply cord 51b in the tire radial direction, but the present invention is not limited to this. A positional relationship between the plurality of conductive portions 52 and the plurality of ply cords 51b in the tire circumferential direction is not particularly limited. That is, in FIG. 3, a position of the conductive portion 52 in the left-right direction may deviate from a position of the ply cord 51b in the left-right direction. Further, the number of the conductive portions 52 and the number of the ply cords 51b may be the same or different.

The conductive portion 52 has conductivity. Volume resistivity of the conductive portion 52 is smaller than volume resistivity of the chafer portion 70 described below.

A first chafer portion 71 has conductivity. The first chafer portion 71 is a rubber member or a composite member of fibers and rubber. As shown in FIG. 1, the first chafer portion 71 covers a portion of the carcass ply 51 provided on the bead portion 13 from the inside in the tire radial direction and from both sides in the tire width direction. The portion of the carcass ply 51 provided on the bead portion 13 includes a portion of the carcass ply 51 that covers the bead core 60 from the inside in the tire radial direction and from both sides in the tire width direction. In the following description, the portion of the carcass ply 51 provided on the bead portion 13 is referred to as a core covering portion 53. The core covering portion 53 extends from the inside of the bead core 60 in the tire width direction through the inside of the bead core 60 in the tire radial direction to the outside of the bead core 60 in the tire width direction. The first chafer portion 71 has an annular shape extending along the tire circumferential direction.

The first chafer portion 71 has a radial covering portion 72 and widthwise covering portions 73 and 74. The radial covering portion 72 is a portion that covers the core covering portion 53 of the carcass ply 51 from the inside in the tire radial direction. The radial covering portion 72 extends in the tire width direction. The widthwise covering portions 73 and 74 are portions that cover the core covering portion 53 of the carcass ply 51 from both sides in the tire width direction. The widthwise covering portion 73 extends from an outer end portion of the radial covering portion 72 in the tire width direction to the outside in the tire radial direction, and covers the core covering portion 53 from the outside in the tire width direction. The widthwise covering portion 74 extends from an inner end portion of the radial covering portion 72 in the tire width direction to the outside in the tire radial direction, and covers the core covering portion 53 from the inside in the tire width direction. The outer end portions of the widthwise covering portions 73 and 74 in the tire radial direction are located inside the outer end portion in the tire radial direction in the portion of the carcass ply 51 that is folded around the bead core 60, in the tire radial direction.

As shown in FIG. 1, the tire body 20 has a tread rubber 21 and a sidewall rubber 22.

The tread rubber 21 is a portion forming a portion of the tread portion 11, and has an annular shape extending along the tire circumferential direction. The tread rubber 21 is provided on the outer side of the carcass layer 50 in the tire radial direction. The tread rubber 21 is connected to the carcass layer 50 via the belt layer 30 and the belt reinforcing layer 40. In FIG. 1, the carcass layer 50 is separated from the tread rubber 21, the belt layer 30, and the belt reinforcing layer 40 in order to show each portion schematically in an easy-to-understand manner.

The tread rubber 21 has a tread under cushion 23, a base layer 24, a cap layer 25, a mini side 26, and an antenna rubber 27.

The tread under cushion 23, the base layer 24, and the cap layer 25 are laminated in this order from the inside in the tire radial direction to the outside in the tire radial direction. An outer surface of the cap layer 25 in the tire radial direction constitutes the tread surface portion 11$a$. The mini side 26 is connected to outer end portions of the laminated tread under cushion 23, the base layer 24 and the cap layer 25 in the tire width direction.

The antenna rubber 27 is embedded so as to straddle the base layer 24 and the cap layer 25. The antenna rubber 27 penetrates the base layer 24 and the cap layer 25 in the tire radial direction. An inner end portion of the antenna rubber 27 in the tire radial direction is connected to the outer surface of the tread under cushion 23 in the tire radial direction. An outer end portion of the antenna rubber 27 in the tire radial direction is exposed on the outer surface of the cap layer 25 in the tire radial direction, and forms a portion of the tread surface portion 11$a$. The antenna rubber 27 may extend intermittently, may extend continuously, or may be scattered in the tire circumferential direction.

The base layer 24, the cap layer 25, and the mini side 26 are relatively difficult to conduct electricity and have low conductivity. The tread under cushion 23 and the antenna rubber 27 are relatively easy to conduct electricity and have conductivity.

The sidewall rubber 22 is a portion forming a portion of the sidewall portion 12 and a portion of the bead portion 13, and has an annular shape extending along the tire circumferential direction. The sidewall rubber 22 is provided outside the carcass layer 50 in the tire width direction. The sidewall rubber 22 is connected to the carcass layer 50. The outer end portion of the sidewall rubber 22 in the tire radial direction is connected to the outer end portion of the tread rubber 21 in the tire width direction. In FIG. 1, in order to show each portion schematically in an easy-to-understand manner, the sidewall rubber 22 and the carcass layer 50 are shown apart from each other, and the sidewall rubber 22 and the tread rubber 21 are shown apart from each other.

The sidewall rubber 22 has a sidewall rubber main body portion 28 and a second chafer portion 29.

The sidewall rubber main body portion 28 is a portion forming a portion of the sidewall portion 12. The outer end portion of the sidewall rubber main body portion 28 in the tire radial direction extends inward in the tire width direction and is located between the carcass layer 50 and the tread rubber 21, the belt layer 30, and the belt reinforcing layer 40.

The second chafer portion 29 is a portion that constitutes a portion of the bead portion 13. The second chafer portion 29 is connected to an inner end portion of the sidewall rubber main body portion 28 in the tire radial direction. The second chafer portion 29 covers the core covering portion 53 in the carcass layer 50 from the outside in the tire width direction. The second chafer portion 29 is connected to the core covering portion 53 and the widthwise covering portion 73 of the first chafer portion 71 from the outside in the tire width direction. In addition, in FIG. 1, in order to show each portion in an easy-to-understand manner, the second chafer portion 29 and the core covering portion 53 are shown apart from each other, and the second chafer portion 29 and the widthwise covering portion 73 are shown apart from each other.

A rubber material constituting the sidewall rubber main body portion 28 and a rubber material constituting the second chafer portion 29 have different volume resistivity from each other. The sidewall rubber main body portion 28 is relatively difficult to conduct electricity. The second chafer portion 29 is relatively easy to conduct electricity and has conductivity.

In the present embodiment, the first chafer portion 71 and the second chafer portion 29 described above constitute a chafer portion 70. That is, in the present embodiment, the tire 10 has the chafer portion 70 that covers at least a portion around the carcass ply 51. In the present embodiment, the chafer portion 70 covers at least the inside of the core covering portion 53 in the tire radial direction and the outside of the core covering portion 53 in the tire width direction. The chafer portion 70 has conductivity. In the chafer portion 70, volume resistivity of the first chafer portion 71 and volume resistivity of the second chafer portion 29 may be the same as each other or may be different from each other. In the present embodiment, the chafer portion 70 covers the inside of the core covering portion 53 in the tire radial direction and both sides of the core covering portion 53 in the tire width direction, and is connected to the core covering portion 53. The chafer portion 70 is a portion that protects the carcass layer 50 from friction with a rim to which the tire 10 is attached.

The belt layer 30 is embedded in the tread portion 11. The belt layer 30 is laminated on the outer side of the carcass layer 50 in the tire radial direction. The belt layer 30 is connected to the carcass ply 51 and the conductive portion 52. The belt layer 30 is located between the tread rubber 21 and the carcass layer 50 in the tire radial direction. Although not shown, the belt layer 30 is configured by embedding a plurality of steel cords in a belt rubber. The belt rubber of the belt layer 30 is relatively easy to conduct electricity and has conductivity. As a result, the belt layer 30 has conductivity.

The belt reinforcing layer 40 is laminated on the outer side of the belt layer 30 in the tire radial direction. The belt reinforcing layer 40 is located between the tread rubber 21 and the belt layer 30 in the tire radial direction. The outer surface of the belt reinforcing layer 40 in the tire radial direction is connected to the inner surface of the tread under cushion 23 of the tread rubber 21 in the tire radial direction.

The belt reinforcing layer 40 is configured by, for example, winding a composite cord made of rubber and nylon around an outer circumferential portion of the belt layer 30 a plurality of times. One roll of the composite cord constituting the belt reinforcing layer 40 is disposed with a gap 41 from each other along the tire width direction. Although not shown, the tread under cushion 23 and the belt layer 30 between which the belt reinforcing layer 40 is interposed in the tire radial direction are connected to each other in the gap 41 between one roll of the belt reinforcing layer 40. The belt reinforcing layer 40 is relatively difficult to conduct electricity.

The carcass ply 51 is provided with a sewn portion 80 in which a conductive thread is sewn. In the present embodiment, the sewn portion 80 is provided in a portion of the carcass ply 51 located inside the bead core 60 in the tire radial direction. In the present embodiment, the sewn portion 80 extends along the tire circumferential direction as shown in FIGS. 2 and 3. The sewn portion 80 is provided, for example, along the entire circumference of the carcass ply 51 along the tire circumferential direction. That is, in the present embodiment, the sewn portion 80 has an annular shape extending along the tire circumferential direction.

In the present embodiment, the sewn portion 80 is sewn through the carcass ply 51. The sewn portion 80 penetrates the carcass ply 51 in the tire radial direction, for example, as shown in FIG. 3. More specifically, the sewn portion 80 penetrates the carcass rubber 51a in the tire radial direction. The sewn portion 80 has at least one first seam portion 80a and at least one second seam portion 80b. In the present embodiment, a plurality of the first seam portions 80a and the second seam portions 80b are provided side by side along the circumferential direction.

The first seam portion 80a is located inside a portion of the carcass ply 51, which is located inside the bead core 60 in the tire radial direction, in the tire radial direction. At least one of the first seam portions 80a is in contact with the chafer portion 70. In the present embodiment, for example, all the first seam portions 80a are in contact with the radial covering portion 72 of the first chafer portion 71.

The second seam portion 80b is located outside a portion of the carcass ply 51, which is located inside the bead core 60 in the tire radial direction, in the tire radial direction. At least one of the second seam portions 80b is in contact with the conductive portion 52. As a result, the sewn portion 80 comes into contact with both the chafer portion 70 and the conductive portion 52, and electrically connects the chafer portion 70 and the conductive portion 52.

In the present embodiment, the second seam portion 80b is provided so as to straddle the outside of the conductive portion 52 in the tire radial direction in the tire circumferential direction, and is in contact with the conductive portion 52 from the outside in the tire radial direction. As a result, in the present embodiment, the sewn portion 80 has at least one of the conductive portions 52 sewn into the carcass ply 51. As shown in FIG. 2, in the present embodiment, the sewn portion 80 has a plurality of conductive portions 52 sewn into the carcass ply 51. That is, in the present embodiment, each of the plurality of second seam portions 80b is in contact with the conductive portion 52. As a result, the sewn portion 80 is in contact with the plurality of conductive portions 52. In the present embodiment, the sewn portion 80 is in contact with all the conductive portions 52. The plurality of second seam portions 80b include a second seam portion 80b that does not come into contact with the conductive portion 52.

As shown in FIG. 3, in the present embodiment, the sewn portion 80 is configured such that a bobbin thread 81 and a needle thread 82 are sewn into the carcass ply 51 by, for example, a sewing machine. The bobbin thread 81 and the needle thread 82 are entangled with each other and are in contact with each other. Accordingly, the bobbin thread 81 and the needle thread 82 are electrically connected. The bobbin thread 81 is a conductive thread that constitutes the plurality of first seam portions 80a. The needle thread 82 is a conductive thread that constitutes the plurality of second seam portions 80b. A portion where the bobbin thread 81 and the needle thread 82 are entangled with each other is embedded in the carcass rubber 51a of the carcass ply 51, for example.

The bobbin thread 81 and the needle thread 82 are, for example, thread-like members containing metal. The bobbin thread 81 and the needle thread 82 are configured by, for example, winding a metal fiber such as stainless steel around an organic fiber. The bobbin thread 81 and the needle thread 82 have conductivity. Volume resistivity of the bobbin thread 81 and volume resistivity of the needle thread 82 may be the same or different from each other.

As shown in FIG. 1, the tire 10 includes a conductive path CP that releases static electricity from the vehicle from a rim on which the tire 10 is mounted to the ground. The conductive path CP is a path through which static electricity transmitted from the rim in the tire 10 passes, and extends from the second chafer portion 29 to the tread surface portion 11a through the first chafer portion 71, the sewn portion 80, the conductive portion 52, the belt layer 30, the gap 41 of the belt reinforcing layer 40, the tread under cushion 23, and the antenna rubber 27 in this order. As a result, the static electricity of the vehicle transmitted from the rim can be released from the tread surface portion 11a to the ground.

In the sewn portion 80 of the present embodiment, the static electricity is transmitted from the bobbin thread 81 to the needle thread 82. Further, as described above, the tread under cushion 23 and the belt layer 30 are connected to each other in the gap 41 of the belt reinforcing layer 40. Therefore, the static electricity that has flowed from the conductive portion 52 to the belt layer 30 flows from the gap 41 to the tread under cushion 23.

According to the present embodiment, the carcass ply 51 includes the sewn portion 80 in which a conductive thread is sewn. Therefore, in the portion of the carcass ply 51 where the sewn portion 80 is provided, electricity can easily pass through the sewn portion 80. As a result, even when the conductivity of the carcass ply 51 is low, static electricity from the vehicle can pass through the carcass ply 51 by the sewn portion 80. Accordingly, regardless of the conductivity of the carcass ply 51, it is possible to obtain the tire 10 having a structure that allows static electricity from the vehicle to be easily released to the ground. Therefore, the amount of carbon contained in the carcass rubber 51a of the carcass ply 51 can be reduced to reduce the rolling resistance of the tire 10, and the static electricity of the vehicle can be suitably released to the ground.

Further, according to the present embodiment, the sewn portion 80 is provided in the portion of the carcass ply 51 located inside the bead core 60 in the tire radial direction. Therefore, the portion of the carcass ply 51 having the sewn portion 80 can be easily brought into contact with the chafer portion 70. As a result, the static electricity from the vehicle transmitted from the rim to the chafer portion 70 can easily pass through the carcass ply 51 by the sewn portion 80. Therefore, the static electricity from the vehicle can be more suitably released to the ground.

Further, for example, when a raw tire is put into a mold and vulcanized to make a tire 10, a rubber of the raw tire is deformed according to a shape of the mold. In this case, the rubber is less likely to be deformed inside the bead core 60 in the tire radial direction. Therefore, by providing the sewn portion 80 in the portion of the carcass ply 51 located inside the bead core 60 in the tire radial direction, the bobbin thread 81 and the needle thread 82 constituting the sewn portion 80 are not easily affected by the deformation of the rubber when the raw tire is vulcanized in the mold. As a result, it is possible to prevent the bobbin thread 81 and the needle thread 82 from being cut.

Further, according to the present embodiment, the sewn portion 80 is sewn through the carcass ply 51 and includes the first seam portion 80a which is in contact with the chafer portion 70 and the second seam portion 80b which is in contact with the conductive portion 52. Therefore, even when the volume resistivity of the carcass rubber 51a in the carcass ply 51 is relatively large and the conductivity of the carcass ply 51 is low, the static electricity from the vehicle transmitted from the rim to the chafer portion 70 can be transferred to the conductive portion 52 via the sewn portion 80. As a result, the static electricity from the vehicle can be transferred to the tread portion 11 via the conductive portion 52, and the static electricity can be released from the tread surface portion 11a to the ground at the tread portion 11. Therefore, the static electricity from the vehicle can be more suitably released to the ground.

Further, according to the present embodiment, the volume resistivity of the conductive portion 52 is smaller than the volume resistivity of the chafer portion 70. Therefore, it is easy to suitably reduce the volume resistivity of the conductive portion 52. As a result, the static electricity can suitably flow to the conductive portion 52 that forms a relatively long conductive path CP from the bead portion 13 to the tread portion 11. Therefore, the static electricity from the vehicle can be more easily released to the ground.

Further, according to the present embodiment, the conductive portion 52 is a thread-like member containing metal. Therefore, it is easy to reduce the volume resistivity of the conductive portion 52 more suitably, and the static electricity is more easily flown from the bead portion 13 to the tread portion 11 by the conductive portion 52. Therefore, the static electricity from the vehicle can be more easily released to the ground. Further, according to the present embodiment, the plurality of conductive portions 52 are provided at intervals along the tire circumferential direction. Therefore, it is possible to increase the conductive path CP that allows the static electricity to flow from the bead portion 13 to the tread portion 11, and the static electricity is more easily flown from the bead portion 13 to the tread portion 11 by the conductive portion 52. Therefore, the static electricity from the vehicle can be more suitably released to the ground.

Further, according to the present embodiment, the sewn portion 80 extends along the tire circumferential direction. Therefore, the sewn portion 80 can easily cross the conductive portion 52, and the second seam portion 80b in the sewn portion 80 can be easily brought into contact with the conductive portion 52. Further, as in the present embodiment, one sewn portion 80 can be easily brought into contact with a plurality of conductive portions 52.

Further, according to the present embodiment, the sewn portion 80 is in contact with the plurality of conductive portions 52 via the second seam portion 80b. Therefore, by providing one sewn portion 80, the plurality of conductive portions 52 can be connected to the chafer portion 70, and it is possible to increase the conductive path CP that allows static electricity to flow from the bead portion 13 to the tread portion 11. Therefore, the static electricity from the vehicle can be suitably released to the ground while reducing the time and effort required to provide the sewn portion 80.

Further, according to the present embodiment, the sewn portion 80 has at least one of the conductive portions 52 sewn into the carcass ply 51. Therefore, the second seam portion 80b can be more reliably brought into contact with the conductive portion 52.

Further, according to the present embodiment, the carcass rubber 51a is relatively difficult to conduct electricity. Therefore, it is difficult for the static electricity from the vehicle to pass through the carcass ply 51. However, as described above, according to the present embodiment, the static electricity from the vehicle is easily released to the ground regardless of the conductivity of the carcass ply 51. That is, the effect that the static electricity is easily released to the ground regardless of the conductivity of the carcass ply 51 described above can be obtained more usefully in a configuration in which the carcass rubber 51a is relatively difficult to conduct electricity.

The embodiment of the present invention is not limited to the above embodiment, and the following configurations can also be adopted.

The sewn portion is not particularly limited as long as it is provided in the carcass ply. The sewn portion may be provided at any position in the carcass ply. The sewn portion may not penetrate the carcass ply. In this case, the seam portion are provided in only one surface of the carcass ply. Even in this case, electricity can be easily conducted in the portion of the carcass ply where the sewn portion is provided.

In the above-described embodiment, the sewn portion 80 has the structure in which two conductive threads are entangled and sewn, but the sewn portion 80 is not limited to this. The sewn portion may be formed by sewing, for example, one conductive thread. In this case, for example, one conductive thread penetrates the carcass ply in the tire radial direction to form each of the first seam portion and the second seam portion. The conductive thread constituting the sewn portion is not particularly limited as long as it is a conductive thread.

Further, the method of sewing the conductive thread when forming the sewn portion is not particularly limited. The sewn portion may not be sewn with the conductive portion. The second seam portion may be in contact with the conductive portion from the inside in the tire radial direction. The sewn portion may be provided on only one of the portions of the carcass ply provided on each of the pair of bead portions, or may be provided on both thereof.

Figure 4:
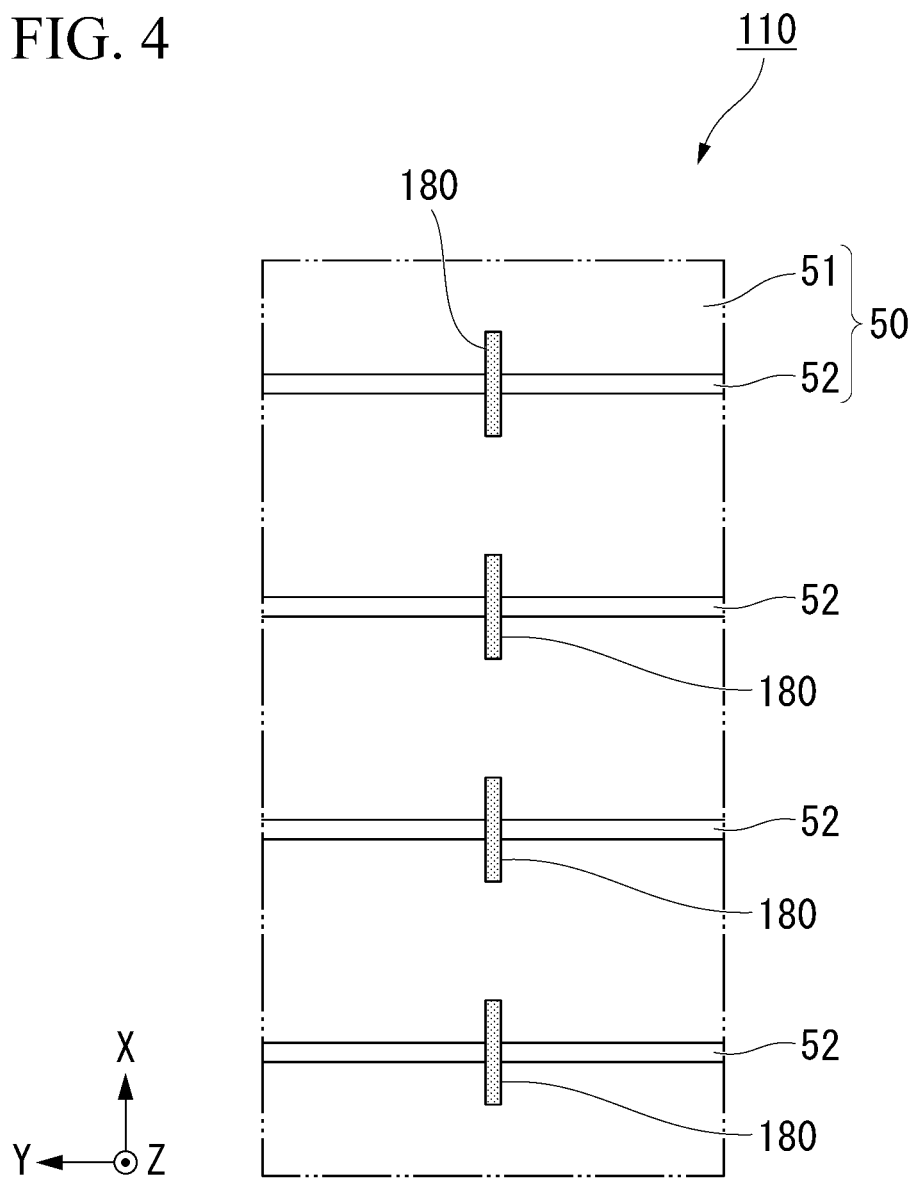
FIG. 4 is a plan view when a portion of a carcass layer of another example of the present embodiment is viewed from the outside in the tire radial direction.

A plurality of sewn portions may be provided as in a sewn portion 180 of a tire 110 shown in FIG. 4. The plurality of sewn portions 180 are disposed so as to be spaced apart from each other along the tire circumferential direction. Each of the plurality of sewn portions 180 extends in the tire circumferential direction. A dimension of the sewn portion 180 in the tire circumferential direction is smaller than a distance between the conductive portions 52 adjacent to each other in the tire circumferential direction. The sewn portion 180 is configured by sewing two conductive threads in the same manner as the sewn portion 80 described above, for example. Each of the plurality of sewn portions 180 is in contact with the conductive portions 52 that are different from each other. Other configurations of the tire 110 are the same as the other configurations of the tire 10 described above.

According to this configuration, a region where the conductive thread is sewn in the carcass ply 51 can be easily reduced as compared with the case where the sewn portion is provided over the entire circumference in the tire circumferential direction. Specifically, for example, since it is not necessary to sew the conductive thread between the sewn portions 180 in the tire circumferential direction, the region where the conductive thread is sewn can be made smaller than that in the case where the sewn portion is provided so as to straddle the adjacent conductive portions 52. As a result, the total amount of conductive threads required to form the sewn portion 180 can be reduced. Therefore, a manufacturing cost of the tire 110 can be reduced. In addition, an amount of work for sewing the conductive thread can be reduced.

In the configuration shown in FIG. 4, positions of the plurality of sewn portions 180 in the tire width direction may be displaced from each other, for example. Further, the plurality of sewn portions 180 may be provided side by side in the tire width direction. Further, one sewn portion 180 may come into contact with two or more conductive portions 52. The conductive portion 52 with which the sewn portion 180 is not in contact may be provided.

The carcass ply may include another sewn portion at a position different from the sewn portion described above. Other sewn portions may be provided, for example, on at least one of the carcass plies located on both sides of the bead core in the tire width direction. When the other sewn portion is provided on the outside of the bead core of the carcass ply in the tire width direction, the other sewn portion may be in contact with the second chafer portion and the conductive portion such that the second chafer portion and the conductive portion are connected to each other.

The conductive portion is not particularly limited as long as it extends along the carcass ply, is located outside the carcass ply in the tire radial direction in the tread portion, and has conductivity. The conductive portion may not contain metal. The conductive portion may be made of, for example, a conductive rubber. The conductive portion may not be a thread-like member, and may be a layered member laminated on the carcass ply. The volume resistivity of the conductive portion may be the same as the volume resistivity of the chafer portion, or may be larger than the volume resistivity of the chafer portion. The conductive portion may not be provided.

The chafer portion is not particularly limited as long as it has conductivity and covers at least a portion around the carcass ply. For example, in the above-described embodiment, the first chafer portion 71 may not have either or both of the widthwise covering portions 73 and 74. When the first chafer portion 71 does not have the widthwise covering portion 73, for example, the first chafer portion 71 is connected to the second chafer portion 29 at the outer end portion of the radial covering portion 72 in the tire width direction. The first chafer portion and the second chafer portion may be integrally molded. The chafer portion may not be provided.

In the above-described embodiment, the carcass ply has one layer of carcass ply, but may be two or more layers of carcass ply. That is, the carcass ply may be configured by laminating a plurality of carcass plies having the same configuration as the carcass ply 51 of the above-described embodiment. In this case, for example, the sewn portion may connect the chafer portion and the conductive portion by collectively penetrating a plurality of layers of carcass ply in the tire radial direction.

Further, when the carcass ply has two or more layers, the sewn portion may be configured by sewing different conductive threads for each layer. Specifically, for example, when the carcass ply is configured by laminating a first carcass ply and a second carcass ply located outside in the tire radial direction of the first carcass ply in the tread portion, the sewn portion may have a first sewn portion sewn into the first carcass ply and a second sewn portion sewn into the second carcass ply. In this case, the first sewn portion and the second sewn portion are electrically connected to each other, the first sewn portion has a first seam portion which is in contact with the chafer portion, and the second sewn portion has a second seam portion which is in contact with the conductive portion. The first sewn portion and the second sewn portion may be electrically connected to each other by being in direct contact with each other, or may be electrically connected to each other via another conductive portion provided between the first carcass ply and the second carcass ply. Another conductive portion may have the same configuration as the conductive portion 52 described above, except that it is disposed between the first carcass ply and the second carcass ply, for example. The first sewn portion and the second sewn portion can each adopt the same configuration as the sewn portion 80 of the above-described embodiment.

The carcass layer may have an inner liner attached to the inner surface of the carcass ply.

The configuration of the tread portion is not particularly limited as long as static electricity can flow from the conductive portion extending to the tread portion to the tread surface portion.

The tire of the above-described embodiment may be used in any vehicle.

The configurations described in the present specification can be appropriately combined within a range that does not contradict each other.

According to one aspect of the tire of the present invention, the carcass ply includes a sewn portion in which a conductive thread is sewn. Therefore, it is possible to easily conduct electricity through the sewn portion in a portion of the carcass ply where the sewn portion is provided. As a result, even when the conductivity of the carcass ply is low, the static electricity from the vehicle can be passed through the carcass ply by the sewn portion. Therefore, regardless of the conductivity of the carcass ply, it is possible to obtain the tire having a structure that allows static electricity from the vehicle to be easily released to the ground. Therefore, the amount of carbon contained in the carcass rubber of the carcass ply can be reduced to reduce the rolling resistance of the tire, and the static electricity of the vehicle can be suitably released to the ground.

The sewn portion may be provided in a portion of the carcass ply located inside the bead core in the tire radial direction.

According to this configuration, the portion of the carcass ply having the sewn portion can be easily brought into contact with the chafer portion. As a result, static electricity from a vehicle transmitted from a rim to the chafer portion can easily pass through the carcass ply by the sewn portion. Therefore, the static electricity from the vehicle can be more suitably released to the ground.

Further, for example, when a raw tire is put into a mold and vulcanized to make a tire, a rubber of the raw tire is deformed according to a shape of the mold. In this case, the rubber is less likely to be deformed inside the bead core in the tire radial direction. Therefore, by providing the sewn portion in the portion of the carcass ply located inside the bead core in the tire radial direction, the conductive thread constituting the sewn portion are not easily affected by the deformation of the rubber when the raw tire is vulcanized in the mold. As a result, it is possible to prevent the conductive thread from being cut.

A conductive portion extending along the carcass ply and located outside the carcass ply in the tire radial direction in the tread portion, and a chafer portion having conductivity and covering at least a portion around the carcass ply may be further provided, and the sewn portion may include the first seam portion which is sewn through the carcass ply and in contact with the chafer portion and a second seam portion which is in contact with the conductive portion.

According to this configuration, even when the volume resistivity of the carcass rubber in the carcass ply is relatively large and the conductivity of the carcass ply is low, the static electricity from the vehicle transmitted from the rim to the chafer portion can be transferred to the conductive portion via the sewn portion. As a result, the static electricity from the vehicle can be transferred to the tread portion via the conductive portion, and the static electricity can be released from the tread surface portion to the ground at the tread portion. Therefore, the static electricity from the vehicle can be more suitably released to the ground.

The volume resistivity of the conductive portion may be smaller than the volume resistivity of the chafer portion.

According to this configuration, it is easy to suitably reduce the volume resistivity of the conductive portion. As a result, the static electricity can be suitably flown to the conductive portion that forms a relatively long conductive path from the bead portion to the tread portion. Therefore, the static electricity from the vehicle can be more easily released to the ground.

The conductive portion is a thread-like member containing metal, and may be a plurality of conductive portions provided at intervals along the tire circumferential direction.

According to this configuration, it is easy to reduce the volume resistivity of the conductive portion more suitably, and the static electricity is more easily flown from the bead portion to the tread portion by the conductive portion. Therefore, the static electricity from the vehicle can be more suitably released to the ground. Further, according to this configuration, the plurality of conductive portions are provided at intervals along the tire circumferential direction. Therefore, it is possible to increase the conductive path that allows the static electricity to flow from the bead portion to the tread portion, and the static electricity is more easily flown from the bead portion to the tread portion by the conductive portion. Therefore, the static electricity from the vehicle can be more suitably released to the ground.

The sewn portion may extend along the tire circumferential direction. According to this configuration, the sewn portion can easily cross the conductive portion, and the second seam portion in the sewn portion can be easily brought into contact with the conductive portion. In addition, one sewn portion can be easily brought into contact with the plurality of conductive portions.

The sewn portion may be in contact with a plurality of the conductive portions. According to this configuration, by providing one sewn portion, the plurality of conductive portions can be connected to the chafer portion, and it is possible to increase the conductive path that allows static electricity to flow from the bead portion to the tread portion. Therefore, the static electricity from the vehicle can be suitably released to the ground while reducing the time and effort required to provide the sewn portion.

The sewn portion may have a configuration in which at least one of the conductive portions is sewn into the carcass ply.

According to this configuration, the second seam portion can be more reliably brought into contact with the conductive portion.

The plurality of the sewn portions may be provided, and the plurality of sewn portions each may be in contact with the conductive portions that are different from each other.

According to this configuration, it is easy to reduce the region where the conductive thread is sewn in the carcass ply. As a result, the total amount of conductive threads required to form the sewn portion can be reduced. Therefore, a manufacturing cost of the tire can be reduced. In addition, an amount of work for sewing the conductive thread can be reduced.

INDUSTRIAL APPLICABILITY

By applying a tire of the present invention to the present field, it is possible to provide a tire having a structure in which static electricity from a vehicle can be easily released to the ground regardless of conductivity of a carcass ply.

REFERENCE SIGNS LIST 10, 110: Tire
11: Tread portion
13: Bead portion
51: Carcass ply
51a: Carcass rubber
51b: Ply cord
52: Conductive portion
60: Bead core
70: Chafer portion
80, 180: Sewn portion
80a: First seam portion
80b: Second seam portion
81: Bobbin thread (conductive thread)
82: Needle thread (conductive thread)

The invention claimed is:
1. A tire comprising:
a tread portion;
a sidewall portion on each side of a tire equatorial portion;
a bead portion on each side of the tire equatorial portion;
a bead core provided in each bead portion;
a carcass ply covering at least a portion around each bead core,
wherein the carcass ply includes on each side of the tire equatorial portion a sewn portion in which a conductive thread is sewn,
at least one conductive portion extending along the carcass ply and located outside the carcass ply in a tire radial direction in the tread portion; and
a chafer portion having conductivity and covering at least a portion around the carcass ply on each side of the tire equatorial portion,
wherein the respective sewn portion is sewn through the carcass ply, and includes a first seam portion which is in contact with the respective chafer portion and a second seam portion which is in contact with the at least one conductive portion, wherein the volume resistivity of the at least one conductive portion is smaller than the volume resistivity of the respective chafer portion, wherein each conductive portion is a thread containing metal, and the at least one conductive portion is a plurality of conductive portions provided at intervals along a tire circumferential direction, and wherein each sewn portion extends along the tire circumferential direction.

2. The tire according to claim 1,
wherein the respective sewn portion is provided in a portion of the carcass ply located inside the respective bead core in a tire radial direction.

3. The tire according to claim 1,
wherein each sewn portion is in contact with the plurality of conductive portions.

4. The tire according to claim 1,
wherein each sewn portion has at least one of the plurality of conductive portions sewn into the carcass ply.

5. The tire according to claim 1,
wherein on each side of the tire equatorial portion a plurality of the sewn portions are provided, and
the plurality of sewn portions are each in contact with different ones of the plurality of conductive portions.

* * * * *